United States Patent [19]
Hindagolla et al.

[11] Patent Number: 5,100,470
[45] Date of Patent: Mar. 31, 1992

[54] WATERFAST INK FORMULATIONS FOR THERMAL INK-JET USING ORGANIC AMINES

[75] Inventors: Suraj L. Hindagolla, Corvallis, Oreg.; Lisa M. Pagh, Champagne, Ill.

[73] Assignee: Hewlett-Packard Company, Palo Alto, Calif.

[21] Appl. No.: 603,107

[22] Filed: Oct. 25, 1990

[51] Int. Cl.$^5$ .............................. C09D 11/02
[52] U.S. Cl. ................................ 106/22; 106/20
[58] Field of Search ..................... 106/22, 23, 20

[56] References Cited

U.S. PATENT DOCUMENTS

| | | | |
|---|---|---|---|
| 4,155,768 | 5/1979 | Adams et al. | 106/23 |
| 4,197,135 | 4/1980 | Bailey et al. | 106/23 |
| 4,409,040 | 10/1983 | Tabayashi et al. | 106/20 |

Primary Examiner—William R. Dixon, Jr.
Assistant Examiner—Helene Klemanski

[57] ABSTRACT

A print which has superior waterfastness can be made on paper from an ink-jet printer using an ink comprising a water soluble dye, water with or without a water soluble organic solvent, and sufficient polyalkylene polyamine to provide the ink with a pH of at least 10. About 2 to 10% urea may be added to the ink to reduce crusting of the ink.

17 Claims, No Drawings

WATERFAST INK FORMULATIONS FOR THERMAL INK-JET USING ORGANIC AMINES

TECHNICAL FIELD

This invention is concerned with inks for use with thermal ink-jets. It is particularly concerned with inks having improved waterfastness.

BACKGROUND ART

Thermal ink-jet printers operate by employing a plurality of resistor elements to expel droplets of ink through an associated plurality of nozzles. In particular, each resistor element, which is typically a pad of a resistive material measuring about 50 $\mu m \times 50$ $\mu m$, is located in a chamber filled with ink supplied from an ink reservoir. A nozzle plate, comprising a plurality of nozzles, or openings, with each nozzle associated with a resistor element, defines one side of the chamber. Upon energizing of a particular resistor element, a droplet of ink is expelled through the nozzle associated with that element toward the print medium, whether paper, transparent film, or the like. The firing of ink droplets is typically under the control of a microprocessor, the signals of which are conveyed by electrical traces to the resistor elements; this enables the formation of alphanumeric and other characters on the print medium.

The tight tolerances of the nozzles (typically 40 to 50 $\mu m$ diameter) require that the ink not clog the nozzles. Further, repeated firings of the resistor elements, which must withstand many millions of firings over the life of the ink cartridge to be commercially practical, can result in fouling of the resistor element. This is unique to thermal ink-jet printers and is known as kogation.

The ink composition must be capable of interacting with the print medium, especially paper, to penetrate the medium without undue spreading and a subsequent decrease in print quality. Finally, the printed characters must dry rapidly in order to prevent smearing, and they need to be waterfast.

Inks are known which possess one or more of the foregoing properties. However, few ink compositions are known that possess all the foregoing properties, since an improvement in one property often results in the degradation of another property. Thus, many inks used commercially represent a compromise in an attempt to achieve an ink evidencing at least an adequate response in each of the foregoing considerations.

Accordingly, investigations continue into developing ink formulations which have improved properties and which do not elevate one property at the expense of the others.

The use of amines to improve waterfastness of inks has been described in U.S. Pat. No. 4,155,768. This patent employs polyamines having six or fewer nitrogen atoms in inks that have a pH of 8 or less.

U.S. Pat. No. 4,197,135 discloses ink compositions in which the pH is 8 or higher. These inks uses polyamines having seven or more nitrogen atoms.

Ink compositions which employ hydroxyethylated polyethylenimine polymers are set out in U.S. Pat. No. 4,659,382.

In U.S. Pat. No. 4,664,708, the inks employ a polymeric dye composed of a polyethylenimine and a sulfonated water soluble dye.

DISCLOSURE OF INVENTION

We have found that inks comprising. by weight:
(a) from about 0.05% to about 10% water soluble dye,
(b) from 0% to about 25% water soluble organic solvent,
(c) from about 0.01% to about 4% polyalkylene polyamine having up to five nitrogen atoms, and
(d) the balance water, provide ink-jet prints having superior waterfastness when the ink has a pH of at least 9. In addition, these inks do not clog jet nozzles as much as their lower pH counterparts.

Preferred inks have a pH of at least 9 and comprise, by weight:
(a) from about 0.05 to about 5% water soluble dye,
(b) from about 2 to about 10% water soluble organic solvent,
(c) from about 0.05 to about 2% polyalkylene polyamine having about 3 to about 5 nitrogen atoms, and
(d) the balance water.

The inks may further include about 2 to 10% urea associated with the solvent to reduce crusting of the ink.

The water soluble dye or chromophore is preferably an azo, anthraquinone, phthalocyanine, triphendioxazine, or triphenylmethane colorant. They have acidic groups, preferably selected from —COOH, —POhd 3H, and —SO$_3$H. Dyes in which all the acidic groups are —SO$_3$H are especially preferred.

The polyamines that are most useful correspond to the formula:

wherein Alk is alkylene having from 1 to about 4 carbon atoms and n is a number from 0 to about 3. For example, diethylenetriamine, triethylenetetramine, and, especially, tetraethylenepentamine may be used. The amount of polyamine in the ink will vary somewhat depending on the amine and other components in the ink. It should, however, be sufficient to raise the pH of the ink to 9 or higher. A preferred pH range is from about 9 to about 12.

The inks of this invention, with elevated pH, provide prints with improved waterfastness. However, the elevated pH can adversely effect parts of the printer, and care must be taken to replace the parts as needed.

Water soluble organic solvents include C$_1$–C$_4$ alkanols such as methanol, ethanol, isopropyl, n-butanol, etc; amides such as dimethylformamide and dimethylacetamide; ketones and ketone alcohols such as acetone and diacetone alcohol; ethers such as tetrahydrofuran and dioxane; nitrogen-containing heterocyclic ketones such as N-methyl-2-pyrrolidone, and 1,3-dimethyl-2-imidazolidone; glycols and thioglycols. Preferred water soluble organic solvents are ethylene glycol, diethylene glycol, formamide, 2-pyrrolidone, triethylene glycol, and 2-methoxy-2-ethoxyethanol; polyethylene glycols with molecular weights up to about 500; and heterocyclic ketones such as N-methylpyrrolidone and 1-3-dimethyl-2-imidazolidone. Mixtures of water and diethylene glycol and mixtures of water, diethylene glycol and N-methyl-pyrrolidone are especially preferred.

Urea may be added to any of the foregoing solvents to a concentration in the ink ranging from about 2 to 10%, and preferably about 5%, to improve the crusting properties of the ink.

EXAMPLES

Inks were prepared using, by weight, 2.0% dye, 5.5% diethylene glycol, tetraethylenepentamine (TEPA) or triethylenetetramine (TETA) in amounts as indicated in the following tables, and the balance water. Prints were made from an ink-jet printer, using each of the inks. Water immersion tests and dye transfer tests were run on specimens from each print.

In the water immersion test, the $L^*$ coordinate of a specimen is determined, and then the specimen is placed in a beaker of water. After it is washed for five minutes, the specimen is dried and the $L^*$ coordinate is remeasured. The difference between the two $L^*$ coordinates is the $\Delta L$.

The dye transfer test comprises printing strips across a sheet of paper, leaving alternate unprinted strips. The optical density (OD) of the printed strips is measured. Next, the paper is mounted at a 45° angle, and water is run across it. Millioptical densities (mOD) of the strips are measured. Lower numbers in both of these tests are desired.

| % TETA | Dye    | pH    | OD   | mOD | ΔL   |
|--------|--------|-------|------|-----|------|
| 0      | DB-168 | 6.6   | 1.28 | 566 | 21.4 |
| 0.5    | "      | 10.9  | 1.34 | 460 | 10.3 |
| 1.0    | "      | 11.1  | 1.35 | 386 | 10.4 |
| 2.0    | "      | 11.3  | 1.37 | 376 | 7.3  |
| 0      | FB-2   | 9.1   | 1.30 | 712 | 44   |
| 0.5    | "      | 10.8  | 1.35 | 642 | 42   |
| 1.0    | "      | 11.0  | 1.29 | 558 | 38   |
| 2.0    | "      | 11.4  | 1.30 | 518 | 29   |
| 0      | DY-86* | 6.9   | 1.22 | 481 | 8    |
| 0.5    | "      | 10.6  | 1.29 | 480 | 4.6  |
| 1.0    | "      | 11.0  | 1.27 | 420 | 3.81 |
| 2.0    | "      | 11.22 | 1.25 | 319 | 3.6  |
| 0      | AR-23**| 7.84  | 1.24 | 715 | 40   |
| 0.5    | "      | 10.5  | 1.29 | 672 | 41   |
| 1.0    | "      | 10.7  | 1.22 | 609 | 39   |
| 2.0    | "      | 10.9  | 1.20 | 530 | 35   |
| 0      | DB-168 | 6.6   | 1.28 | 566 | 21.4 |
| 0.5    | "      | 10.9  | 1.29 | 449 | 6.5  |
| 1.0    | "      | 11.0  | 1.32 | 439 | 5.1  |
| 2.0    | "      | 11.2  | 1.31 | 338 | 2.05 |
| 0      | FB-2   | 9.1   | 1.30 | 712 | 44   |
| 0.5    | "      | 10.8  | 1.28 | 634 | 37   |
| 1.0    | "      | 11.0  | 1.25 | 548 | 37   |
| 2.0    | "      | 11.2  | 1.22 | 503 | 34   |
| 0      | DY-86  | 6.9   | 1.22 | 481 | 8    |
| 0.5    | "      | 10.6  | 1.23 | 371 | 4.1  |
| 1.0    | "      | 10.9  | 1.22 | 300 | 3.4  |
| 2.0    | "      | 11.1  | 1.23 | 275 | 3.9  |
| 0      | AR-23  | 7.8   | 1.24 | 715 | 40   |
| 0.5    | "      | 10.4  | 1.25 | 697 | 37   |
| 1.0    | "      | 10.7  | 1.23 | 555 | 37   |
| 2.0    | "      | 10.8  | 1.17 | 477 | 31   |

*DY 86 = Direct Yellow 86
**AR 23 = Acid Red 23

At the higher pHs, these dyes do not clog jet nozzles as much their lower pH counterparts.

INDUSTRIAL APPLICABILITY

These inks are particularly useful in making prints on paper substrates by the programmed application of heat to the ink adjacent to a selected orifice during relative movement between the paper substrate and the reservoir.

We claim:

1. An ink for an ink-jet printer, said ink having a pH of at least 9 and comprising, by weight:
   (a) from about 0.05% to about 10% water soluble dye,
   (b) from 0% to about 25% of a water soluble organic solvent,
   (c) from about 0.01% to about 4% of a polyalkylene polyamine having from one to five nitrogen atoms, and
   (d) the balance water.

2. The ink of claim 1 wherein the polyamine is diethylene triamine, triethylene tetramine, or tetraethylene pentamine.

3. The ink of claim 1 wherein the water soluble dye is an azo dye.

4. The ink of claim 1 wherein the organic solvent is diethylene glycol, formamide, or 2-pyrrolidone.

5. The ink of claim 1 further including about 2 to 10% urea.

6. The ink of claim 1 wherein the dye has one or more acidic groups selected from $-COOH$, $-PO_3H$, and $-SO_3H$.

7. The ink of claim 6 wherein all the acidic groups on the dye are $-SO_3H$.

8. An ink for an ink-jet printer, said ink having a pH of at least 9 and comprising by weight:
   (a) from about 2 to about 5% water soluble dye,
   (b) from about 2 to about 10% water soluble organic solvent,
   (c) from about 0.05 to about 2% polyalkylene polyamine having about 3 to about 5 nitrogen atoms, and
   (d) the balance water.

9. The ink of claim 8 wherein the water soluble dye is an azo dye.

10. The ink of claim 8 wherein the organic solvent is diethylene glycol, formamide, or 2-pyrrolidone.

11. The ink of claim 8 further including about 2 to 10% urea.

12. The ink of claim 8 wherein the dye has one or more acidic groups selected from $-COOH$, $-PO_3H$, and $-SO_3H$.

13. The ink of claim 12 wherein all the acidic groups on the dye are $-SO_3H$.

14. The ink of claim 13 containing about 2% dye, from about 5 to about 6% diethylene glycol, and triethylene tetramine or tetraethylene pentamine as the polyamine.

15. The ink of claim 14 additionally containing about 5% urea.

16. The ink of claim 13 containing about 2% dye, from about 7 to about 8% 2-pyrrolidone, and tetraethylene pentamine as the polyamine.

17. The ink of claim 16 additionally containing about 5% urea.